(12) United States Patent
Cao (10) Patent No.: US 11,571,066 B2
(45) Date of Patent: Feb. 7, 2023

(54) EMBEDDED PLATE FRAME STRUCTURE

(71) Applicant: Guohua Cao, Guangdong (CN)

(72) Inventor: Guohua Cao, Guangdong (CN)

( * ) Notice: Subject to any disclaimer, the term of this patent is extended or adjusted under 35 U.S.C. 154(b) by 230 days.

(21) Appl. No.: 16/899,572

(22) Filed: Jun. 11, 2020

(65) Prior Publication Data

US 2021/0345777 A1 Nov. 11, 2021

(30) Foreign Application Priority Data

May 9, 2020 (CN) .......................... 202020755455.5

(51) Int. Cl.
*B65D 6/08* (2006.01)
*A47B 96/02* (2006.01)
*A47B 55/02* (2006.01)
*A47B 96/20* (2006.01)

(52) U.S. Cl.
CPC ............ *A47B 96/021* (2013.01); *A47B 55/02* (2013.01); *B65D 7/14* (2013.01); *A47B 2096/203* (2013.01)

(58) Field of Classification Search
CPC .... A47B 96/021; A47B 2096/203; B65D 7/14
See application file for complete search history.

(56) References Cited

U.S. PATENT DOCUMENTS

| | | | | |
|---|---|---|---|---|
| 981,205 | A * | 1/1911 | Loetzer .................... | B65D 7/14 220/493 |
| 1,259,210 | A * | 3/1918 | Clark ................ | E04F 15/02405 160/DIG. 7 |
| 2,598,962 | A * | 6/1952 | Anseele .................... | B65D 7/36 220/616 |
| 4,903,853 | A * | 2/1990 | Lin .......................... | B65D 7/26 220/6 |
| 10,674,817 | B1 * | 6/2020 | Cao ......................... | A47B 88/40 |
| 11,224,291 | B1 * | 1/2022 | Cheng .................... | A47B 88/40 |
| 2005/0077299 | A1 * | 4/2005 | Cheng .................... | A47B 55/02 220/485 |
| 2016/0052665 | A1 * | 2/2016 | Tsai ......................... | B65D 7/12 220/494 |
| 2016/0332770 | A1 * | 11/2016 | Tsai .......................... | B65D 7/12 |
| 2018/0339800 | A1 * | 11/2018 | Cao ........................... | B65D 7/16 |
| 2020/0165029 | A1 * | 5/2020 | Wang ...................... | B65D 7/42 |
| 2022/0022649 | A1 * | 1/2022 | Cao ...................... | A47B 96/021 |

FOREIGN PATENT DOCUMENTS

| | | | | |
|---|---|---|---|---|
| DE | 202021101491 U1 * | 5/2021 | ............. | B65D 15/22 |
| FR | 2953696 A1 * | 6/2011 | ........... | A47B 96/021 |

* cited by examiner

*Primary Examiner* — Kimberley S Wright (57) ABSTRACT

An embedded plate frame structure, having a polygonal or arc-shaped frame body; the polygonal frame body includes at least a first frame, a second frame and a third frame; a panel is installed on the frame body; the first frame, the second frame and the third frame are formed by metal profiles; the metal profiles are provided with accommodating grooves; peripheral sides of the panel are respectively inserted into the corresponding accommodating grooves of the first frame, the second frame and the third frame and extruded, such that the panel is connected with the first frame, the second frame and the third frame into a whole; the metal profile is provided with a reinforcing portion, and the reinforcing portion is integrally formed with an outer side of the metal profile.

8 Claims, 11 Drawing Sheets

EMBEDDED PLATE FRAME STRUCTURE

BACKGROUND OF THE INVENTION

The present invention relates to the technical field of metal plate frames, and in particular, to an embedded plate frame structure.

At present, there are many kinds of shelves in the market, which may roughly fall into fixed shelves that are not easy to disassemble, combined shelves that are easy to disassemble, etc. The combined shelves that are easy to disassemble have the advantages of being easy to store and transport.

The existing combined shelf usually includes a bracket and a plate frame, where the plate frame is mainly formed by a frame and a panel through welding, and such a shelf has the following disadvantages:

1. The shelf has too many welding positions, poor structural stability and environmental pollution.

2. It takes a lot of time to perform welding, which is not high in production efficiency, wastes materials and has a high cost.

3. The shelf is not attractive, and sharp convex parts exist after plate frame welding, which easily causes scratches and has certain potential safety hazards.

BRIEF SUMMARY OF THE INVENTION

An objective of the present invention is to overcome the foregoing shortcomings in the prior art and provide an embedded plate frame structure which has few welding parts, reduces production costs, has strong bearing capacity, is attractive and has no potential safety hazards.

In order to implement the foregoing objective, the present invention provides an embedded plate frame structure, which includes a frame body, where the frame body is a polygonal frame body or an arc-shaped frame body; the polygonal frame body includes at least a first frame, a second frame and a third frame; a panel is installed on the frame body; the first frame, the second frame and the third frame are formed by metal profiles through bending; the metal profiles are provided with accommodating grooves; peripheral sides of the panel are respectively inserted into the corresponding accommodating grooves of the first frame, the second frame and the third frame and extruded, such that the panel is connected with the first frame, the second frame and the third frame into a whole; the metal profile is provided with a reinforcing portion, and the reinforcing portion is integrally formed with an outer side of the metal profile.

Preferably, the polygonal frame body also includes a fourth frame, the panel is planar and is horizontally inserted into the frame body, the metal profile is provided with a cutting groove for forming the frame body through bending, the frame body is bent to wrap the panel on a middle portion of the frame body, and four corners of the panel are welded to the frame body at four corners on an inner side of the frame body to form metal welding spots.

Preferably, the frame body is an arc-shaped frame body, the panel has a curved surface which is a hollow cylinder or a hollow polygonal cylinder, both ends of the panel are respectively vertically inserted into accommodating grooves in two upper and lower arc-shaped frame bodies, the panel is installed between the two arc-shaped frame bodies, both ends of the panel are welded, and both ends of the two arc-shaped frame bodies are welded to form a metal welding seam.

Preferably, the panel is a metal plate.

Preferably, a tail end of the reinforcing portion is bent into a square shape and an inverted U shape, and the inverted U shape is bent inwards or outwards.

Preferably, a tail end of the reinforcing portion is bent into a square shape and an overlapped part, and the overlapped part is overlapped inwards or outwards.

Preferably, a tail end of the reinforcing portion is bent into a square shape and an arc shape, and the arc shape is bent inwards or outwards and is semicircular or circular.

Preferably, a tail end of the reinforcing portion is directly bent into an arc shape from a straight edge, and the arc is bent inwards or outwards and is semicircular or circular.

Preferably, a tail end of the reinforcing portion has a vertical structure.

Preferably, the panel is a stretched metal mesh plate or a woven metal net, the stretched metal mesh plate or the woven metal net is provided with a plurality of meshes, and the meshes are rhombic or in other polygonal shapes.

Compared with the prior art, the present invention has the following beneficial effects:

The embedded plate frame structure according to the present invention is provided with a frame body, where the frame body includes a first frame, a second frame, a third frame and a fourth frame; a panel is installed on the frame body; the first frame, the second frame, the third frame and the fourth frame are formed by metal profiles through bending; the metal profiles are provided with accommodating grooves; peripheral sides of the panel are respectively inserted into the corresponding accommodating grooves of the first frame, the second frame, the third frame and the fourth frame and extruded, such that the panel is connected with the first frame, the second frame, the third frame and the fourth frame into a whole; the metal profile is provided with a reinforcing portion, and the reinforcing portion is integrally formed with an outer side of the metal profile. The embedded plate frame structure according to the present invention has the advantages of being simple and stable, having strong bearing capacity, enabling stamped, stretched or cut waste materials to be recycled, having few welding parts, reducing production costs, being environmentally friendly and high in production efficiency, saving production materials, and being attractive and having no potential safety hazards, etc.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other accompanying drawings from these accompanying drawings without creative efforts.

In the accompanying drawings:
11. first frame, 12. second frame, 13. third frame, 14. fourth frame, 15. panel, 151. mesh, 2. metal profile, 21. cutting groove, 22. accommodating groove, 23. metal welding spot, 24. reinforcing portion, 25. metal welding seam, 31. polygonal frame body, 32. arc-shaped frame body.

DETAILED DESCRIPTION OF THE INVENTION

The following will clearly and completely describe the technical solutions in the embodiments of the present invention with reference to accompanying drawings in the embodiments of the present invention. Obviously, the described embodiments are some embodiment of the present invention, not all of the embodiments. All other embodiments obtained by a person of ordinary skill in the art based on the embodiments of the present invention without creative efforts shall fall within the protection scope of the present invention.

Embodiment 1

Figure 1:
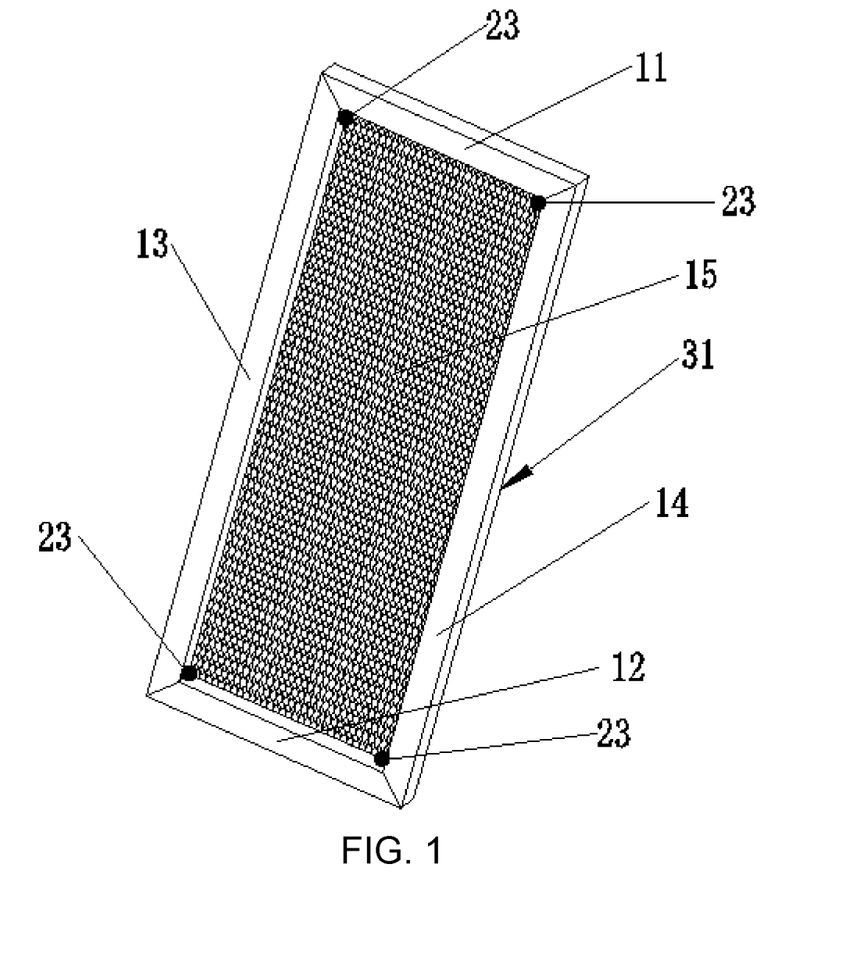
FIG. 1 is a schematic structural view of an embedded plate frame structure according to Embodiment 1 of the present invention.
Figure 2:
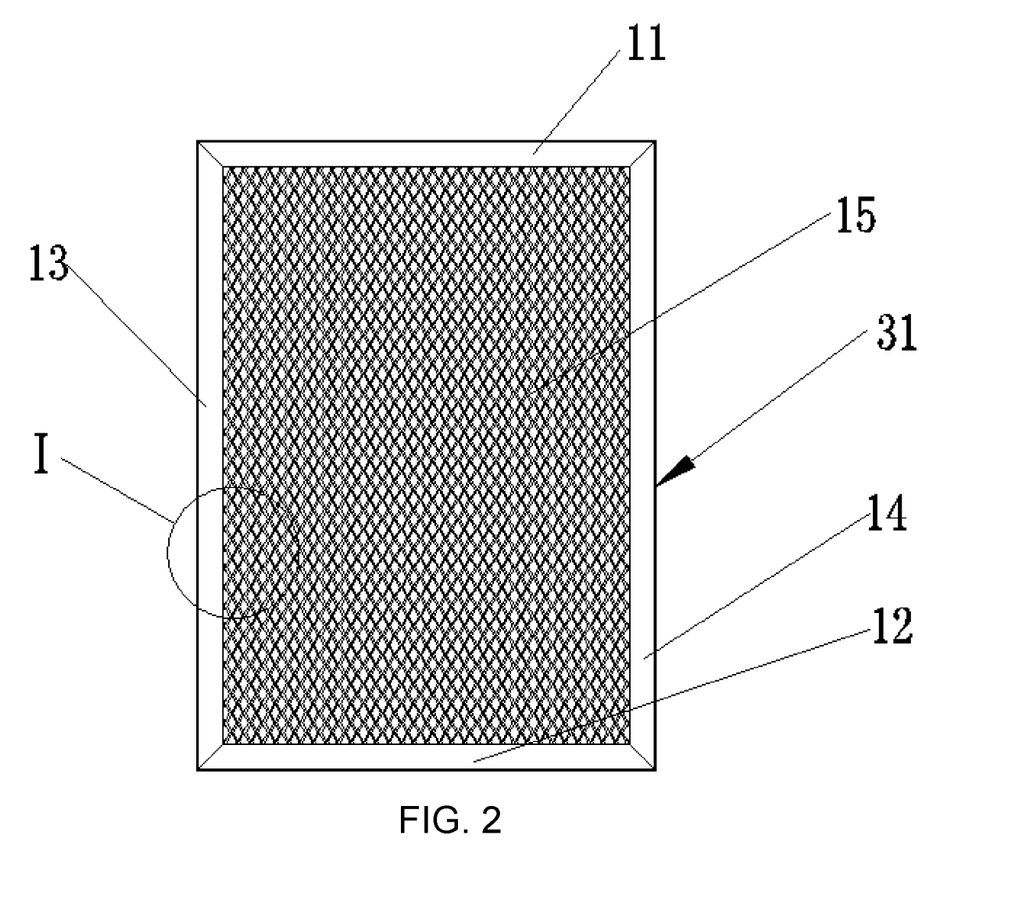
FIG. 2 is a front view of the embedded plate frame structure according to Embodiment 1 of the present invention.

Referring to FIG. 1, the present invention provides an embedded plate frame structure, which includes a frame body, where the frame body is arranged as a metal plate frame main body, and the frame body is made of metal materials, such as stainless steel and iron.

Figure 3:
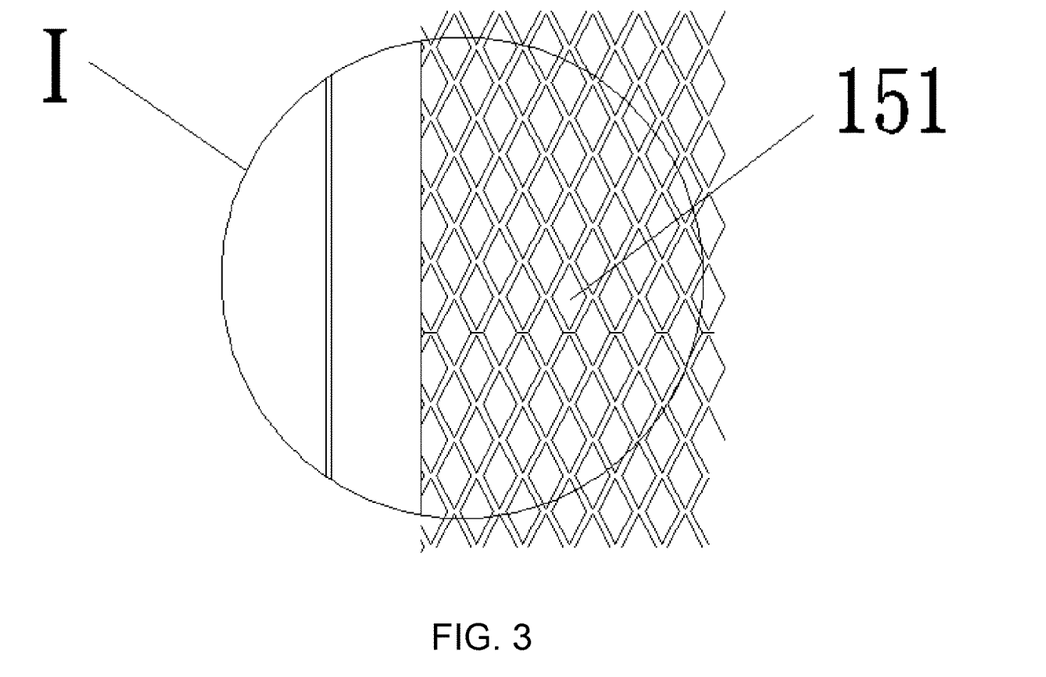
FIG. 3 is an enlarged view of I in FIG. 2.

Specifically, referring to FIG. 3, a panel 15 is installed on the frame body and is a metal plate formed by stamping. The panel 15 is a stretched metal mesh plate or a woven metal net, and the stretched metal mesh plate or the woven metal net is provided with a plurality of meshes 151. Preferably, in this embodiment, the meshes 151 are rhombic. Certainly, according to actual needs, the meshes 151 may also be arranged into different shapes such as circular, hexagonal or other polygonal shapes, which is not limited to this embodiment.

Referring to FIGS. 1 to 4, the frame body is a polygonal frame body 31; the polygonal frame body 31 includes at least a first frame 11, a second frame 12 and a third frame 13; a panel 15 is installed on the frame body; the first frame 11, the second frame 12 and the third frame 13 are formed by metal profiles 2 through bending; the metal profiles 2 are provided with accommodating grooves 22; peripheral sides of the panel 15 are respectively inserted into the corresponding accommodating grooves 22 of the first frame 11, the second frame 12 and the third frame 13 and extruded, such that the panel 15 is connected with the first frame 11, the second frame 12 and the third frame 13 into a whole; the metal profile 2 is provided with a reinforcing portion 24, and the reinforcing portion 24 is integrally formed with an outer side of the metal profile 2. The reinforcing portion 24 is arranged, such that the metal plate frame structure has a bearing part, and the bearing capacity is strengthened; the bending causes the contact area between the metal plate frame structure and the ground or the contact surface to be increased, which obviously increases the bearing capacity compared with a straight edge in direct contact; moreover, the metal plate frame structure is not prone to deformation and can be used as a table, a stool, a storage cabinet, a bearing plate or the like which is required to have the bearing capacity.

Figure 4:
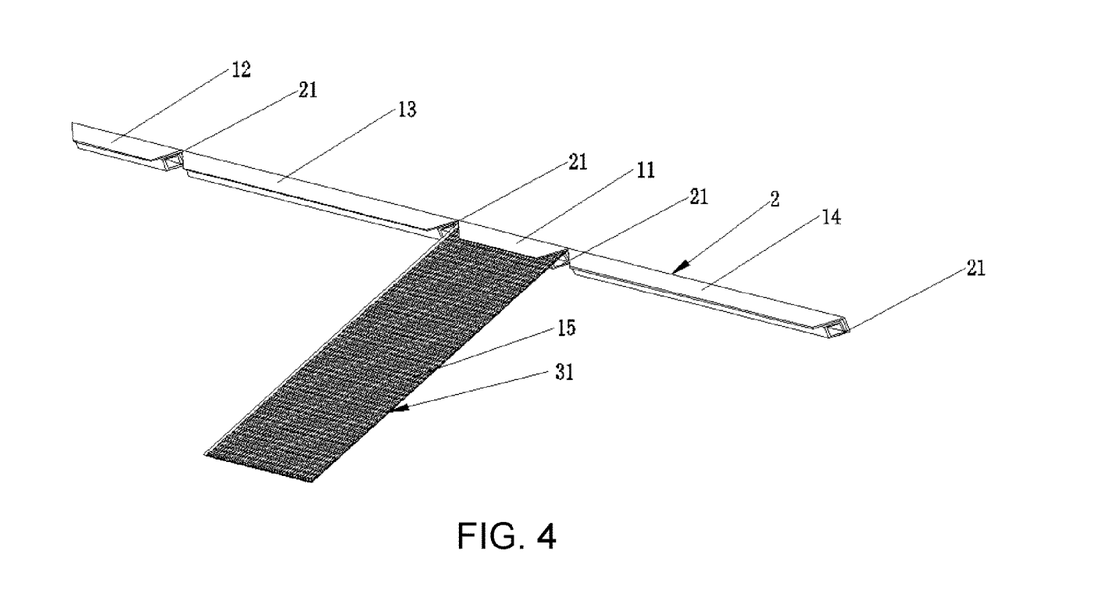
FIG. 4 is a schematic breakdown structure view of the embedded plate frame structure according to Embodiment 1 of the present invention.

Referring to FIG. 4, the polygonal frame body 31 also includes a fourth frame 14, the panel 15 is planar and is horizontally inserted into the frame body, the metal profile 2 is provided with a cutting groove 21 for forming the frame body through bending, and the frame body is bent to wrap the panel 15 on a middle portion of the frame body. Waste materials generated by the cutting groove 21 can be recycled and are stamped quickly in one time, thus being environmentally friendly and having short processing time.

Four corners of the panel 15 are welded to the frame body at four corners on an inner side of the frame body to form metal welding spots 23, so that the welding area is small, and there are a small amount of welding spots, with only four corners needing to be welded. If there are a sufficient number of welding machines, the welding can be performed in one time, thereby saving production time and reducing labor costs.

Figure 5:
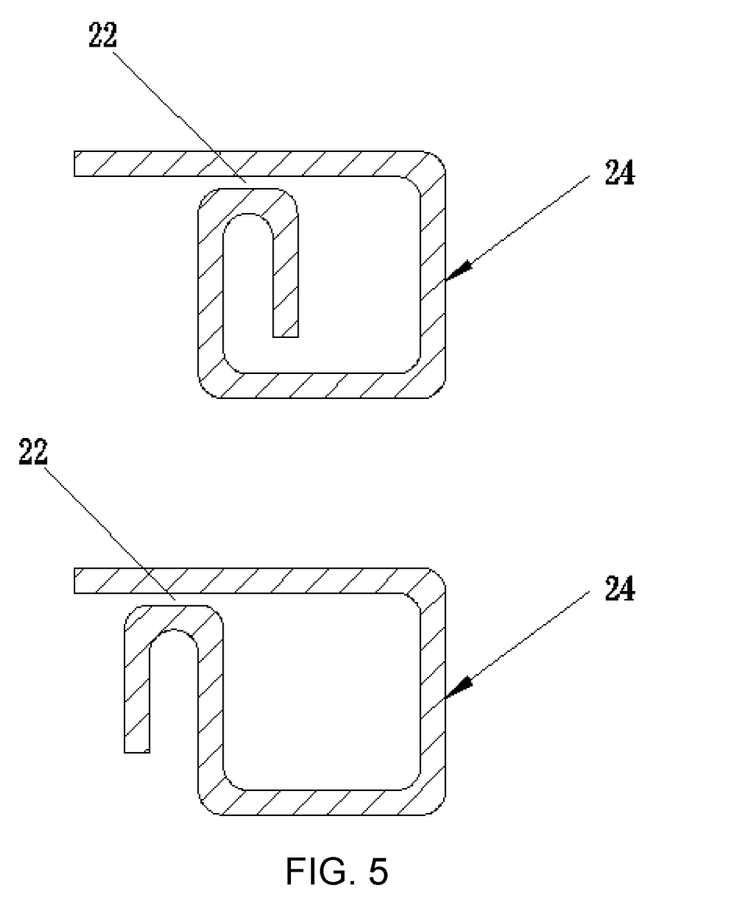
FIG. 5 is a schematic view of a cross-sectional structure of a first reinforcing portion according to Embodiment 1 of the present invention.

Referring to FIG. 5, in Embodiment 1, a tail end of the reinforcing portion 24 is bent into a square shape and an inverted U shape, and the inverted U shape is bent inwards or outwards.

Figure 6:
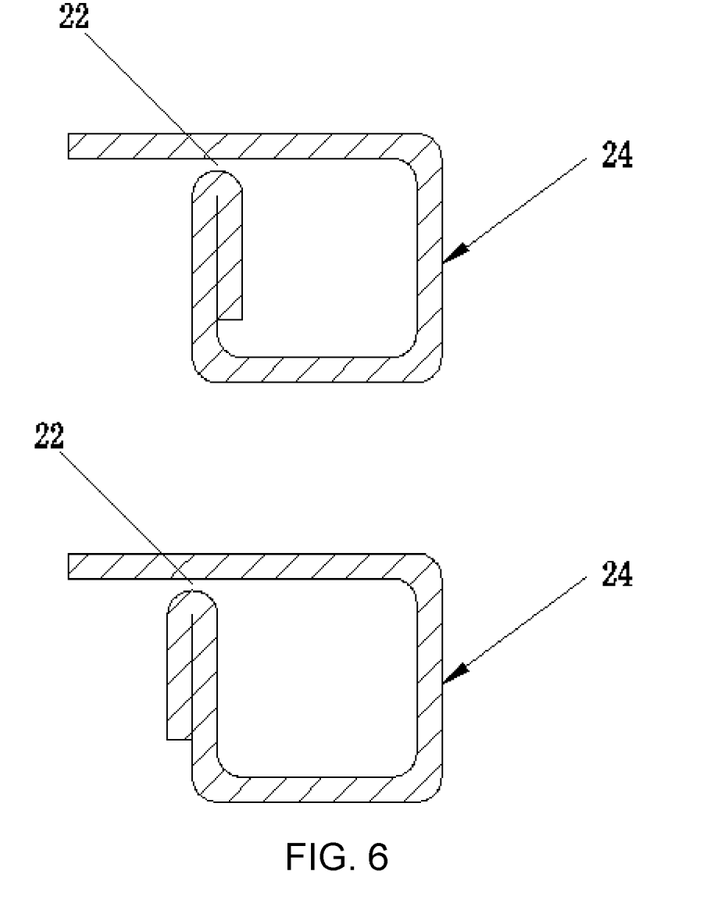
FIG. 6 is a schematic view of a cross-sectional structure of a second reinforcing portion according to Embodiment 1 of the present invention.

Referring to FIG. 6, in another embodiment, a tail end of the reinforcing portion 24 is bent into a square shape and an overlapped part, and the overlapped part is overlapped inwards or outwards.

Figure 7:
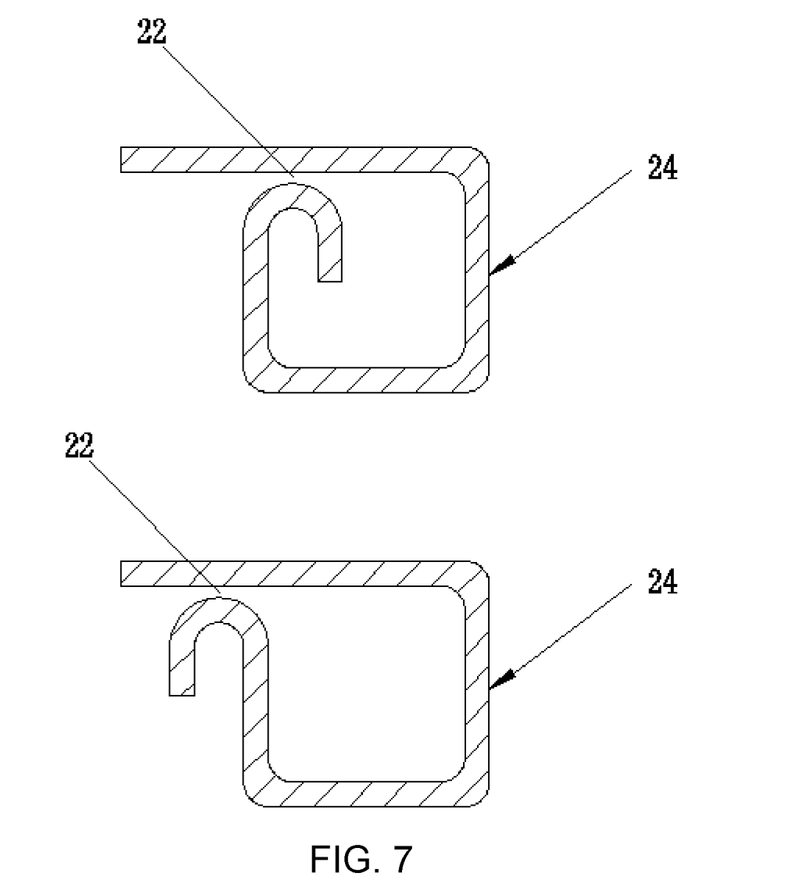
FIG. 7 is a schematic view of a cross-sectional structure of a third reinforcing portion according to Embodiment 1 of the present invention.

Referring to FIG. 7, in another embodiment, a tail end of the reinforcing portion 24 is bent into a square shape and an arc shape, and the arc shape is bent inwards or outwards and is semicircular.

Figure 8:
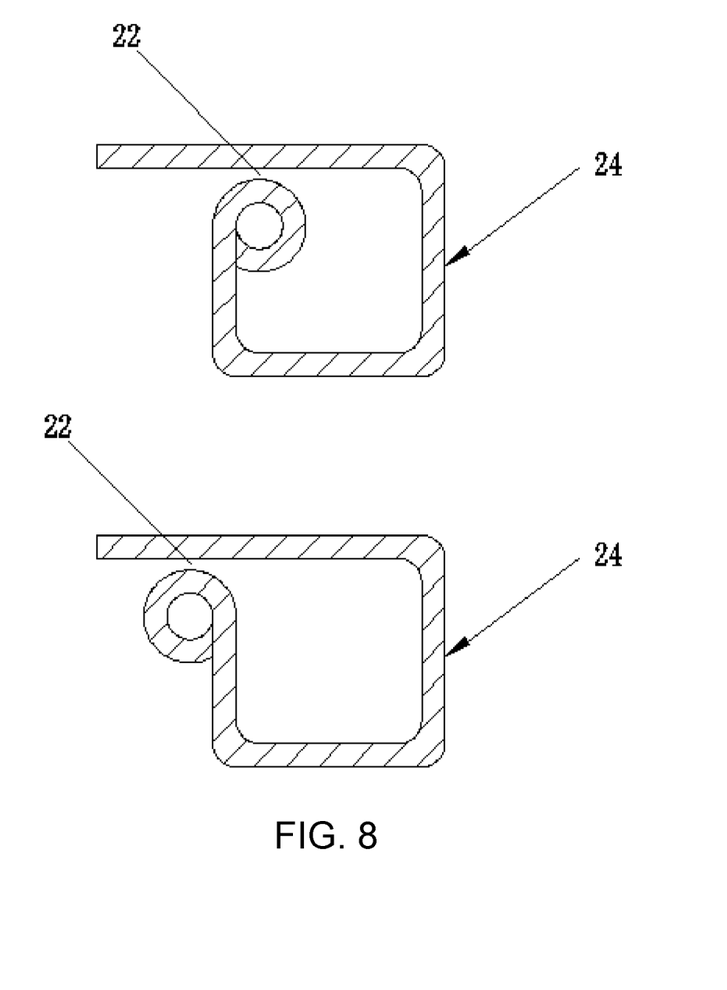
FIG. 8 is a schematic view of a cross-sectional structure of a fourth reinforcing portion according to Embodiment 1 of the present invention.

Referring to FIG. 8, in another embodiment, a tail end of the reinforcing portion 24 is bent into a square shape and an arc shape, and the arc shape is bent inwards or outwards and is circular.

Figure 9:
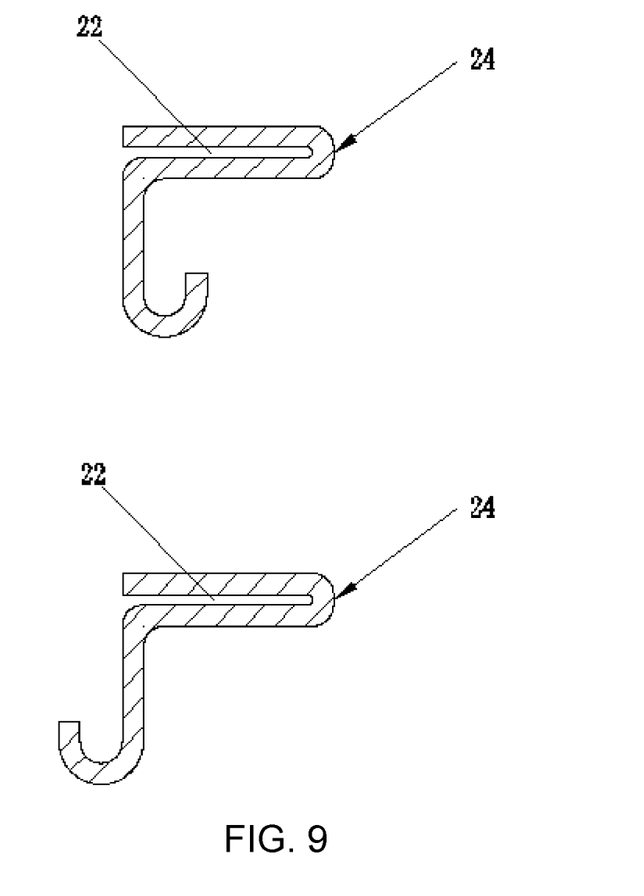
FIG. 9 is a schematic view of a cross-sectional structure of a fifth reinforcing portion according to Embodiment 1 of the present invention.

Referring to FIG. 9, in another embodiment, a tail end of the reinforcing portion 24 is directly bent into an arc shape from a straight edge, and the arc is bent inwards or outwards and is semicircular.

Figure 10:
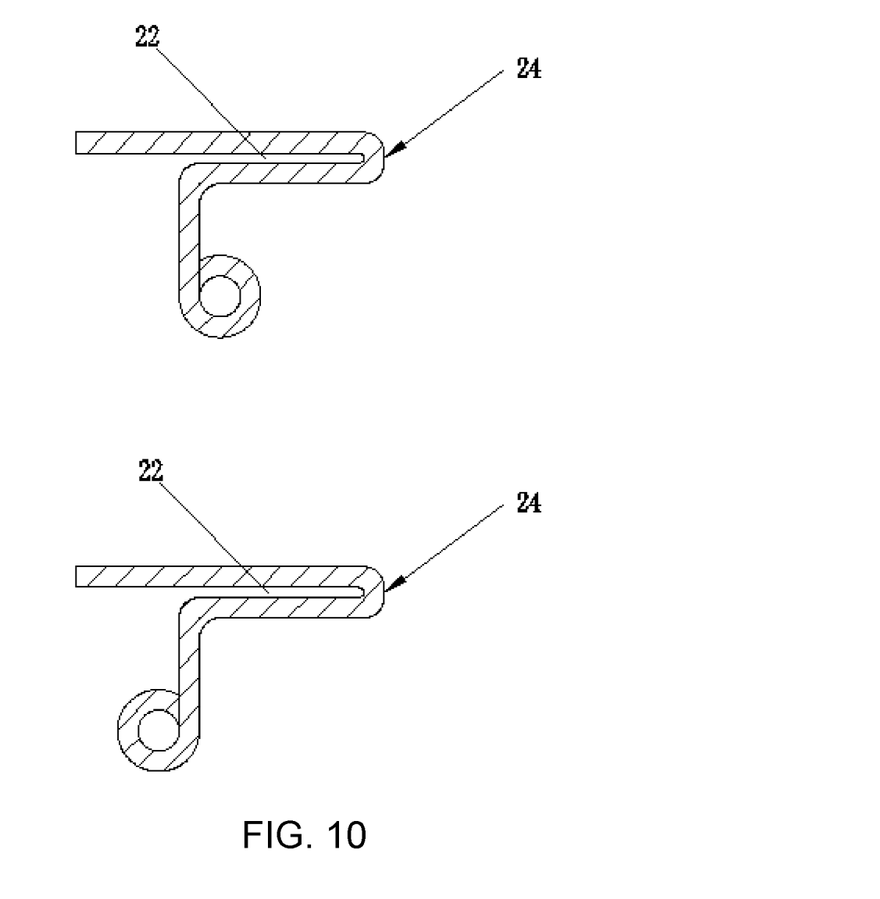
FIG. 10 is a schematic view of a cross-sectional structure of a sixth reinforcing portion according to Embodiment 1 of the present invention.

Referring to FIG. 10, in another embodiment, a tail end of the reinforcing portion 24 is directly bent into an arc shape from a straight edge, and the arc shape is bent inwards or outwards and is circular.

Figure 11:
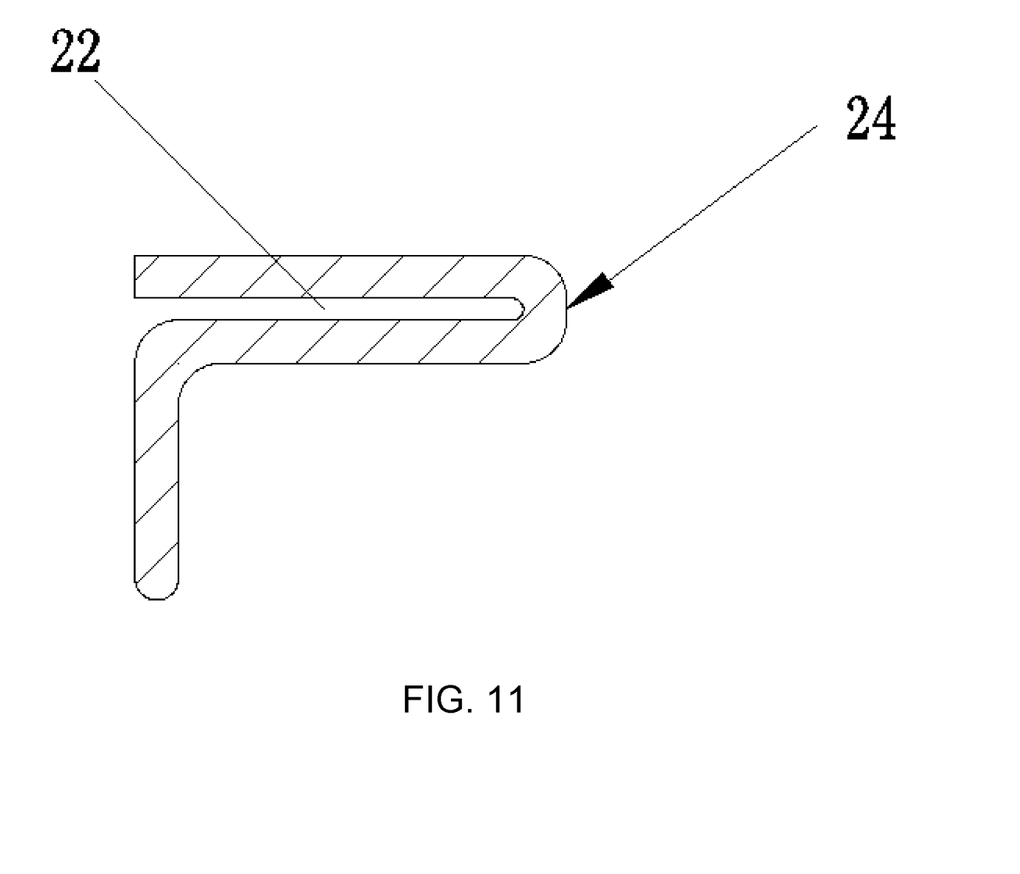
FIG. 11 is a schematic view of a cross-sectional structure of a seventh reinforcing portion according to Embodiment 1 of the present invention.

Referring to FIG. 11, in another embodiment, a tail end of the reinforcing portion 24 has a vertical structure.

It should be noted herein that the reinforcing portions 24 described above may be mixed and matched. Certainly, the reinforcing portions 24 in the present invention may also be changed according to actual needs, and are not limited to the foregoing embodiment.

Embodiment 2

Figure 12:
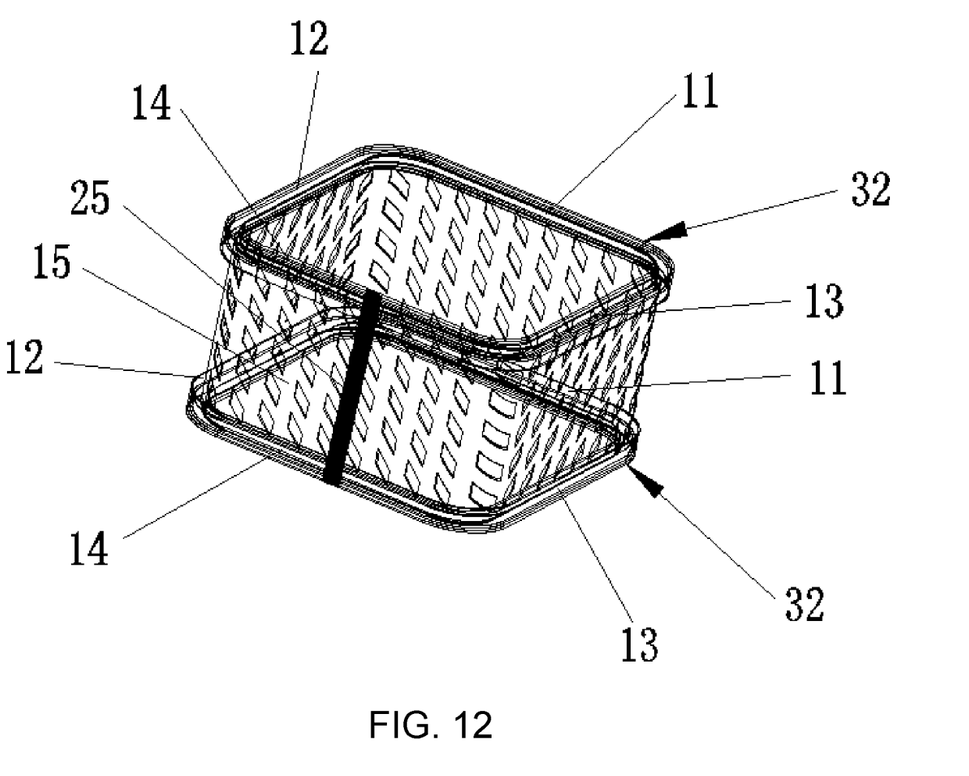
FIG. 12 is a schematic structural view of an embedded plate frame structure according to Embodiment 2 of the present invention.

Referring to FIG. 12, the frame bodies are arc-shaped frame bodies 32; the arc-shaped frame body 32 includes a first frame 11, a second frame 12, a third frame 13 and a fourth frame 14; joints of the first frame 11, the second frame 12, the third frame 13 and the fourth frame 14 are in arc connection; the first frame 11, the second frame 12, the third frame 13 and the fourth frame 14 are formed by metal profiles 2 through bending to form a complete annular arc-shaped frame 32; both ends of the arc-shaped frame 32 are welded to form a metal welding seam 25; the metal profiles 2 are provided with accommodating grooves 22; the panel 15 has a curved surface which is a hollow cylinder or a hollow polygonal cylinder; the arc-shaped frame body 32 and the panel 15 are matched with each other in shape; and both ends of the panel 15 are respectively vertically inserted into the accommodating grooves 22 in the two upper and lower arc-shaped frame bodies 32. Specifically, peripheral sides of the panel 15 are respectively inserted into the corresponding accommodating grooves 22 of the first frame 11, the second frame 12, the third frame 13 and the fourth frame 14 and extruded, such that the panel 15 is connected with the first frame 11, the second frame 12, the third frame 13 and the fourth frame 14 into a whole; the panel 15 is inserted into one arc-shaped frame body 32, the other arc-shaped frame body 32 is inserted into the panel 15, so that the panel 15 is installed between the two arc-shaped frame bodies 32, both ends of the panel 15 are welded, both ends of the two arc-shaped frame bodies 32 are welded to form a metal welding seam 25; the metal profile 2 is provided with a reinforcing portion 24, and the reinforcing portion 24 is integrally formed with an outer side of the metal profile 2. The reinforcing portion 24 is arranged, such that the metal plate frame structure has a bearing part, and the bearing capacity is strengthened; the bending causes the contact area between the metal plate frame structure and the ground or the contact surface to be increased, which obviously increases the bearing capacity compared with a straight edge in direct contact; moreover, the metal plate frame structure is not prone to deformation and can be used as a table, a stool, a storage cabinet or the like which is required to have the bearing capacity.

In this embodiment, the arc-shaped frame body 32 includes the first frame 11, the second frame 12, the third frame 13, and the fourth frame 14 and can also be formed by the metal profile 2 through integral bending, with transition parts being in arc connection.

The frame body may be other polygonal frame bodies, and is not limited to a quadrilateral frame. The panel 15 should be correspondingly changed and bent into a hollow polygonal cylinder.

The frame body may be circular and can be seen as a polygonal frame body consisting of numerous sides. The panel 15 is correspondingly changed and bent into a hollow cylinder.

The foregoing examples are preferred embodiments of the present invention. However, the embodiments of the present invention are not limited by the foregoing embodiments. A series of changes can be made within the foregoing spirit and principle, and also fall into the protection scope of the present invention.

In summary, the present invention has the following beneficial effects:

The embedded plate frame structure according to the present invention is provided with a frame body, where the frame body is a polygonal frame body 31 or an arc-shaped frame body 32; the polygonal frame body 31 includes at least a first frame 11, a second frame 12 and a third frame 13; a panel 15 is installed on the frame body; the first frame 11, the second frame 12 and the third frame 13 are formed by metal profiles 2 through bending; the metal profiles 2 are provided with accommodating grooves 22; peripheral sides of the panel 15 are respectively inserted into the corresponding accommodating grooves 22 of the first frame 11, the second frame 12 and the third frame 13 and extruded, such that the panel 15 is connected with the first frame 11, the second frame 12 and the third frame 13 into a whole; the metal profile 2 is provided with a reinforcing portion 24, and the reinforcing portion 24 is integrally formed with an outer side of the metal profile 2. The embedded plate frame structure according to the present invention has the advantages of being simple and stable, having strong bearing capacity, enabling stamped, stretched or cut waste materials to be recycled, having few welding parts, reducing production costs, being environmentally friendly and high in production efficiency, saving production materials, and being attractive, having no potential safety hazards, etc.

The foregoing embodiments are preferred embodiments of the present invention. However, the embodiments of the present invention are not limited by the foregoing embodiments. Any other changes, modifications, replacements, combinations and simplifications made without departing from the spirit and principle of the present invention should all be equivalent replacement manners, and fall within the protection scope of the present invention.

What is claimed is:

1. An embedded plate frame structure, comprising a frame body, wherein the frame body is an arc-shaped frame body (32); the polygonal frame body (31) comprises at least a first frame (11), a second frame (12) and a third frame (13); a panel (15) is installed on the frame body; the first frame (11), the second frame (12) and the third frame (13) are formed by metal profiles (2) through bending; the metal profiles (2) are provided with accommodating grooves (22); peripheral sides of the panel (15) are respectively inserted into the corresponding accommodating grooves (22) of the first frame (11), the second frame (12) and the third frame (13) and extruded, such that the panel (15) is connected with the first frame (11), the second frame (12) and the third frame (13) into a whole; the metal profile (2) is provided with a reinforcing portion (24), and the reinforcing portion (24) is integrally formed with an outer side of the metal profile (2); the panel (15) has a curved surface which is a hollow cylinder or a hollow polygonal cylinder, both ends of the panel (15) are respectively vertically inserted into accommodating grooves (22) in two upper and lower arc-shaped frame bodies (32), the panel (15) is installed between the two arc-shaped frame bodies (32), both ends of the panel (15) are welded, and both ends of the two arc-shaped frame bodies (32) are welded to form a metal welding seam (25).

2. The embedded plate frame structure according to claim 1, wherein the panel (15) is a metal plate.

3. The embedded plate frame structure according to claim 1, wherein a tail end of the reinforcing portion (24) is bent into a square shape and an inverted U shape, and the inverted U shape is bent inwards or outwards.

4. The embedded plate frame structure according to claim 1, wherein a tail end of the reinforcing portion (24) is bent into a square shape and an overlapped part, and the overlapped part is overlapped inwards or outwards.

5. The embedded plate frame structure according to claim 1, wherein a tail end of the reinforcing portion (24) is bent into a square shape and an arc shape, and the arc shape is bent inwards or outwards and is semicircular or circular.

6. The embedded plate frame structure according to claim 1, wherein a tail end of the reinforcing portion (24) is directly bent into an arc shape from a straight edge, and the arc is bent inwards or outwards and is semicircular or circular.

7. The embedded plate frame structure according to claim 1, wherein a tail end of the reinforcing portion (24) has a vertical structure.

8. The embedded plate frame structure according to claim 1, wherein the panel (15) is a stretched metal mesh plate or a woven metal net, the stretched metal mesh plate or the woven metal net is provided with a plurality of meshes (151), and the meshes (151) are rhombic or in other polygonal shapes.

\* \* \* \* \*